ELECTRONIC SIGNAL PROCESSING SYSTEMS

Filed July 27, 1967

2 Sheets-Sheet 1

ELECTRONIC SIGNAL PROCESSING SYSTEMS

Filed July 27, 1967 2 Sheets-Sheet 2

United States Patent Office 3,512,094

Patented May 12, 1970

3,512,094

ELECTRONIC SIGNAL PROCESSING SYSTEMS

Bert H. Dann, Altadena, and Norton W. Bell, Pasadena, Calif., assignors to Bell & Howell Company, Chicago, Ill., a corporation of Illinois Filed July 27, 1967, Ser. No. 656,573
Int. Cl. H04q 3/00
U.S. Cl. 328—137 6 Claims

ABSTRACT OF THE DISCLOSURE

Signal train resolving systems having sequentially switched signal processing circuits correlated in number to the signal components or component signal trains to be resolved and providing substitute signals during their off periods to reduce the generation of error signals and increase the mutual compatibility of the switching components.

CROSS-REFERENCE TO RELATED APPLICATIONS

Pat. No. 3,440,341, entitled "Two Color Display From Line Sequential Color Recording," by James Reekie and Edward G. Thurston, issued Apr. 22, 1969 and assigned to the present assignee; Pat. No. 3,456,069, entitled "Color Synchronization for Two Color per Line Television Systems," by Edward G. Thurston, issued July 15, 1969 and assigned to the present assignee; patent application S.N. 656,578, entitled "Electronic Signal Processing Apparatus," filed of even date herewith, by Bert H. Dann, and assigned to the assignee of the present application, and herewith incorporated by reference herein; patent application S.N. 656,574, entitled "Information Indexing Apparatus," filed of even date herewith, by Norton W. Bell, and assigned to the assignee of the present application, and herewith incorporated by reference herein.

BACKGROUND OF THE INVENTION

Field of the invention

The subject invention relates to electronic switching systems and, more particularly, to apparatus for resolving signal trains into signal components of component signal trains.

Description of the prior art

Although the subject invention is not necessarily limited to the field of video tape recording, it will be described with particular reference thereto, in order to provide an efficient basis for a ready understanding of the invention and its principles and features.

At the present, video tape recording has progressed to a level where taped performances are a frequent feature of television broadcast operation. In addition, video tape recording apparatus for localized educational or home entertainment purposes are making their appearance on the market. Special problems are, however, encountered with video tape recorders that are to be able to handle not only monochromatic programs, but also color performances. The primary reason therefor resides in the fact that many recorder-induced signal imperfections which go practically unnoticed in the course of a black and white performance, produce intolerable picture degradations in the case of color display. As a result, color video tape equipment tends to be highly complex and has to conform to construction and performance standards of the highest order, which as a practical matter largely excludes its application to the localized educational and home entertainment field.

Highly advanced solutions to this problem are disclosed in the above mentioned patent applications S.N. 538,815 and S.N. 538,816. According to those inventions, color components of video programs are recorded line sequentially to be subsequently reproduced from the recording in a similar sequence. Black and white-quality video tape recorders can then be employed for the recording of color programs.

SUMMARY OF THE INVENTION

The present invention is primarily concerned with improvements of line sequential conversion systems disclosed in the previously cited applications S.N. 538,815 and S.N. 538,816. From a broader aspect, the subject invention is concerned with improvements of apparatus for resolving a signal train including a number of differently characterized signal components into corresponding signal components or component signal trains.

The differently characterized signal components are components which are distinguished among themselves on the basis of a predetermined criterion or predetermined criteria. For instance, with reference to the color video field, the differently characterized signal components may be color signals allocated to different colors, such as to the primary colors red, green and blue, or signals of similar import. From another point of view, the differently characterized signal components may be signal components allocated to different heads of a multihead tape recorder. In this case, the signal components pertaining to all the heads may be viewed as representing a "signal train."

The signal train resolving apparatus according to the invention comprises an individual signal processing means for each signal component as to which the signal train is to be resolved. Each of these processing means includes signal processing circuits connected between input means and output means and constructed to process an electric signal component received at the input means and to apply the processed signal component to the output means. This apparatus further includes switching means having an input circuit connected to control signal receiving means, having a control circuit connected to the above mentioned signal processing circuits for suspending at least the application of the named processed signal component to the output means in response to a control signal received at the mentioned control signal receiving means, and having an output circuit connected to the above mentioned output means for providing in response to the named control signal an auxiliary signal applied to the output means in substitution of the mentioned processed signal component.

The apparatus described in the preceding paragraph further includes means connected to the input means of the individual signal processing means for applying the signal train to be resolved to the input means of these different signal processing means, and means connected to the control signal receiving means of the different signal processing means for providing different control signals in a predetermined repetitive sequence for the switching means of the individual signal processing means and for selectively applying these control signals to the control signal receiving means for the individual signal processing means.

The inherent capability of this apparatus to provide the above mentioned substitute signal increases the mutual compatibility of the different signal processing means and improves their joint performance. The provision of a deliberate substitute signal as described above counters the occurrence of undefined drift signals during the off periods of each of the different signal processing means. For this reason, the outputs of two or more of these processing means can be interconnected to operate on a common amplifier or other common signal processing means. The described substitute signal provision permits one or more of the individual signal processing means to be switched off while one or more of the remaining signal processing means are switched on, without a degradation of the output signals of the latter processing means by random drift signals of the former processing means. The fact that the substitute signals are provided by the same switching means which control the operation of the signal processing circuits considerably simplifies the entire system, since it dispenses with the requirement that a special substitute signal generator or apparatus be provided for each of the different signal processing means.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

Figures 1, 2:
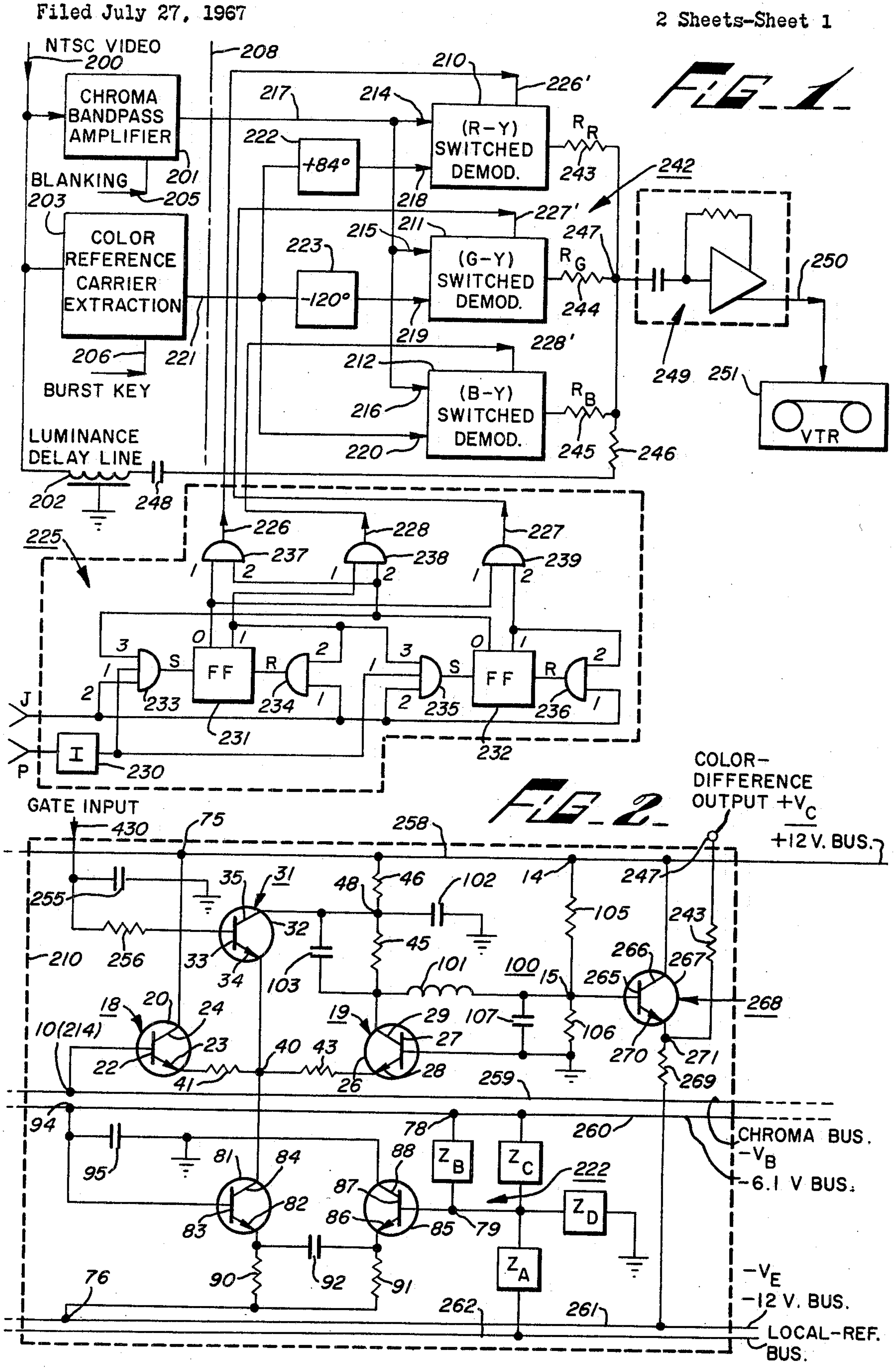
FIG. 1 is a diagram of a switched demodulator system according to a preferred embodiment of the invention.
FIG. 2 is a diagram of a demodulator used in the system of FIG. 1.

The system illustrated in FIG. 1 presents an example of apparatus according to the subject invention for resolving a signal train including a number of differently characterized modulated signal components into corresponding sequentially occurring demodulated signal components.

More specifically, the system illustrated in FIG. 1 permits the recording of video color signal components in sequential fashion. For the purpose of the subject description, it is asumed that the signal components to be recorded are contained in signal trains conforming to the well-known NTSC color video standard used for network broadcasting.

The color video signals are received at 200 and the chrominance component thereof is processed by a chroma bandpas amplifier 201, while the luminance or Y component is passed through a delay line 202 and the reference components are processed by a local-reference system 203, including the conventional burst amplifier, phase detector and reference oscillator circuits.

The chroma bandpass amplifier 201 has the conventional control input 205 for a blanking signal, while the local-reference system 203 has an input 206 for the conventional burst key.

The components so far described and shown to the left of the phantom line 208 inserted in FIG. 1 are conventional color video receiver components and are thus not described herein in particular detail. (See Fink, Television Engineering Handbook (McGraw-Hill 1957), hereinafter referred to as Fink, pp. 15–31 et seq. and 16–148 et seq.)

To the right of the phantom line 208 of FIG. 1, components embodying the subject invention are shown. These include three switched demodulators 210, 211 and 212 having inputs 214, 215 and 216, respectively, connected to a conduit 217 for receiving, for the purpose of demodulation and gating, chrominance signals processed by the chroma bandpass amplifier 201. It will be noted in this connection that the number of switched demodulators corresponds in FIG. 1 to the number of different color components.

The demodulators 210, 211 and 212 also have reference signal inputs 218, 219 and 220 for receiving a reference signal controlling the demodulation processes in these demodulators. The demodulating reference signal is derived from the output 221 of the local reference system 203 and is that signal which in conventional television receiver apparatus is at subcarrier frequency and serves as a phase reference for color processing (see Fink, p. 15–33).

For phase-correct demodulation, the reference input 218 is connected to the reference system output 221 through a phase shifting network 222, and the reference input 219 is connected to the reference system output 221 through a phase shifting network 223. The local-reference system 203 is in a conventional manner constructed so that the local-reference signal supplied at its output 221 is at the phase which corresponds to the so-called "*B*−*Y*" (blue minus luminance) component of the chrominance signal. The reference input 220 is thus directly connected to the reference system output 221.

The phase shifter 222 imposes a phase shift of +84 degrees upon reference signals flowing to the reference input 218, while the phase shifter 223 imposes a phase shift of −120 degrees upon reference signals flowing to the reference input 219.

This renders the demodulators 210, 211 and 212 capable of demodulating, respectively, the "*R*−*Y*" (red minus luminance), the "*G*−*Y*" (green minus luminance), and the "*B*−*Y*" (blue minus luminance) color difference signals (on the significance of these difference signals see Fink, pp. 9–3 to 9–6). Adjustments in the phase shifts imposed by shifters 222 and 223 may be required depending on the actual color performance of the phosphors used in the display tube (not shown) which is to show the recorded scenes. This latter detail is a matter of general knowledge in the art.

The system of FIG. 1 further includes a sequencer 225 having three outputs 226, 227 and 228. These sequencer outputs 226, 227 and 228 are connected as shown to gating inputs 226′, 227′ and 228′ of the switched demodulators 210, 211 and 212, respectively. The sequencer 225 provides first gating pulses at its output 226, second gating pulses at its output 227, and third gating pulses at its output 228 in a sequential fashion. The mutual time relationship of these gating pulses corresponds to the time relationship of the color difference signal components of the chrominance signal provided at output 217 of the chroma bandpass amplifier, and the actual timing of these gating pulses is so that the demodulator 210 is gated to demodulate the *R*−*Y* component, the demodulator 211 is gated to demodulate the *G*−*Y* component, and to demodulate the *B*−*Y* component, all in time-correct sequence.

To accomplish this purpose, the sequencer 225 may be composed of logic circuit elements which are driven by pulses stepping at horizontal can rate and designated herein by the letter J, and pulses occurring at the picture field rate and designated herein by the letter P.

The J-pulses may, for example, be derived from the horizontal output stage (not shown) of a typical color television receiver circuit (see Fink, fig. 16–252). The P-pulses may be derived from a field recognition circuit (not shown) as used in video systems to supply pulses at picture field rate. An improved field recognition circuit and its connection to the sequencer 225 are described in the above mentioned information indexing application by Norton W. Bell.

The sequencer according to the embodiment shown in FIG. 1 includes a conventional inverter 230 and two conventional set-reset flip-flops 231 and 232, each having inputs S and R (set and reset) and outputs 0 and 1, as well as conventional AND-elements 233, 234, 235, 236, 237, 238 and 239, each of which changes its output voltage level when all of its inputs are energized.

P-pulses are inverted by the inverter 230 and are applied to a first input of the AND-element 233 and to a first input of the AND-element 235. The J-pulses are applied to a second input of the AND-element 233, to a first input of the AND-element 234, to a second input of the AND-element 235, and to a first input of the AND-element 236.

The 0-output of flip-flop 231 is applied to a first input of the AND-element 237 and to a first input of the AND-element 239. The 1-output of this flip-flop 231 is applied to the second input of the AND-element 234, to the third input of the AND-element 235, and to a first input of the AND-element 238.

The 0-output of the flip-flop 232 is applied to the third input of the AND-element 233, to the second input of the AND-element 237, and to the second input of the AND-element 238. The 1-output of this flip-flop 232 is applied to the second input of the AND-element 236 and to the second input of the AND-element 239.

The S-input of the flip-flop 231 is controlled by the output of the AND-element 233, while the output of the AND-element 234 controls the R-input of this flip-flop 231. Similarly, the S-input of the flip-flop 232 is controlled by the AND-element 235, while the AND-element 236 controls the R-input of this flip-flop 232.

The function of the illustrated sequencer 225 is now self-explanatory on the basis of the above-defined nature of the J and P signals, of the interconnections shown, and of the familiar functions of the logic elements designated above.

Those skilled in the art will recognize that the sequencer 225 provides at its outputs 226, 227 and 228 timed gating pulses which sequentially gate or switch the demodulators 210, 211 and 212 by alternating between positive and negative values.

The demodulators are connected to a resistive matrix 242 which includes resistors 243, 244, 245 and 246 connected to a summing point 247. The resistor 243 is connected to receive the demodulated signal of demodulator 210. The resistor 244 is connected to receive the demodulated signal of demodulator 211, and the resistor 245 is connected to receive the demodulated signal of the demodulator 212. The resistor 246 is connected through a capacitor 248 to the luminance delay line 202, so as to feed luminance and synchronization information to the summing point 247.

In accordance with conventional color video matrixing techniques, the resistors 243, 244 and 245 are mutually proportioned to matrix the various color components in accordance with their inherent chromaticity values. In the present embodiment, the resistive value of the resistor 243 is, accordingly, 1.5 times higher than the resistive value of the resistor 245, while the resistive value of the resistor 246 is 3.9 times higher than the resistive value of the resistor 245.

The demodulator and matrixing action of the apparatus of FIG. 1 provides at the summing point 247 red, green and blue color components of the video signal in sequential fashion. These components are amplified by a common feedback amplifier 249, which may be of conventional design, and delivered to an output 250 which is connected to a one-head video tape recorder 251 or to another recording apparatus. The signals appearing at the output 250 are recorded by the recorder in a line-sequential fashion for subsequent playback.

Figure 3:
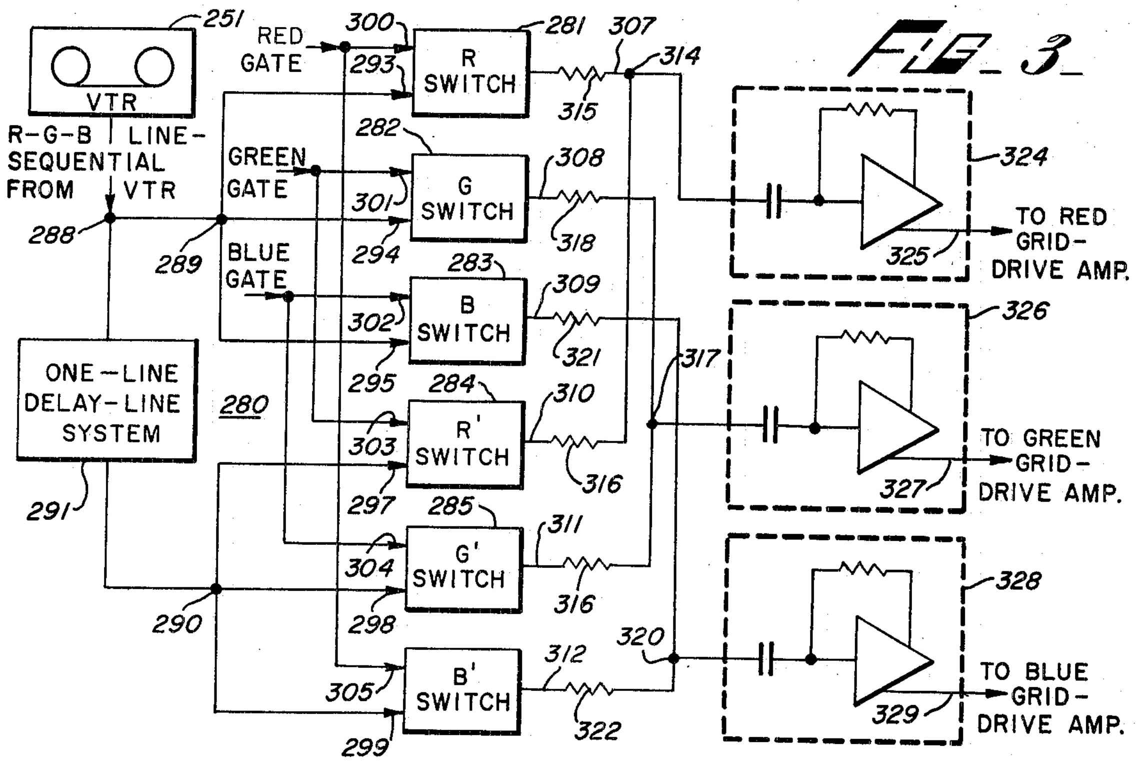
FIG. 3 is a diagram of a signal train resolution system in accordance with a further preferred embodiment of the invention.

The circuitry of each of the switched demodulators 210, 211 and 212 is based on the circuitry of the apparatus shown in FIG. 3 of the above mentioned copending application by Bert H. Dann, one of the present coinventors This is apparent from FIG. 2 of the accompanying drawings which shows a diagram of the switched demodulator 210 and illustrates the phase shifting networks 222 and 223 of FIG. 1. The switched demodulators 211 and 212 are duplications of the demodulator 210 and are thus not shown in FIG. 2.

Like reference numerals are employed for like parts as far as those components of the circuit of FIG. 2 are concerned that have already been shown and described in connection with FIG. 3 of the above mentioned copending Dann application.

In addition to the components already described as to their nature and function in connection with such FIG. 3, the demodulator of FIG. 2 includes a high-frequency bypass capacitor 255 of a value of, say, some 300 picofarads connected between the gate input 430 and ground, and a resistor 256 of some 100 ohms connected between the gate input 430 and the switching transistor base 33. Capacitor 255 and resistor 256 prevent an impression of carrier-frequency energy upon the gate input.

The demodulator of FIG. 2 further includes a bus 258 for supplying a collector voltage $+V_C$, a chroma bus 259 for supplying the chrominance signal from amplifier output 217 (see FIG. 1), a further bus 260 for supplying a base voltage $-V_B$, yet another bus for supplying an emitter voltage $-V_E$ and a local-reference bus 262 for supplying the local-reference signal from the local-reference system output 221 (see FIG. 1). Buses 258 through 262 may be common to the three demodulators 210, 211 and 212.

The phase shifter 222 merits special consideration, since different phase shifts are required for the different demodulators, as has been explained in connection with FIG. 1 when the shifters 222 and 223 and the absence of a shifter for demodulator 212 were discussed.

To bring out this detail more fully, the phase shifter 222 has been shown in FIG. 2 as being broken down into components $Z_A$, $Z_B$, $Z_C$, and $Z_D$.

By way of example, these components may consist of the following elements:

(1) For the phase shifter 222, providing a shift of some +84 degrees:

$Z_A$ is a capacitor of about 300 picofarads,
$Z_B$ is a resistor of about 160 ohms,
$Z_C$ is an inductance of about 7.55 micro-henrys, and
$Z_D$ is open;

(2) For the phase shift 223,, providing a shift of some −120 degrees:

$Z_A$ is an inductance ofabout 7.55 micro-henrys,
$Z_B$ is a resistor of about 220 ohms,
$Z_C$ is open, and
$Z_D$ is a capacitor of 330 picofarads;

(3) No phase shift is required with respect to the demodulator 212.

$Z_A$ is thus shorted, while $Z_B$ and $Z_C$ are open. A capacitor of about 300 picofarads may, however, be used as component $Z_D$.

These values are, of course, only illustrative.

The demodulated color difference signal appearing at the output terminals 14 and 15 of the demodulator of FIG. 2 is applied to a base electrode 265 and a collector electrode 266 of a transistor 267 of an emitter-follower amplifier stage 268 included in the demodulator 210. A load resistor 269 connects the emitter electrode 270 of the transistor 267 to the $-V_E$ bus 261, while the collector electrode 266 is connected to the $+V_C$ bus 258.

The amplified output signal is taken from the junction 271 of the emitter electrode 270 and ther esistor 269, and is passed through the resistor 243 which, it will be noted, is the matrix resistor of the same designation shown in FIG. 1, connected to the summing point 247.

To give an example, the matrix resistor 243 may have a value of about 1,500 ohms. The corresponding matrix resistors 244 and 245 pertaining to the demodulators 211 and 212 may then be dimensioned at 3,920 and 1,000 ohms, respectively, to proivde for chromaticity-correct matrixing.

One outstanding feature of the system illustrated in FIGS. 1 and 2 is that switching transients are kept at a minimum in view of the advanced circuitry according to the subject invention. This is very important, since recurring erratic transients would render a recording of color video signals or a faithful reproduction thereof highly im- ·racticable, if not impossible. The operation of this fea-ıre has been explained in the above mentioned copend-ıg Dann application.

In addition, the special circuitry according to the inven-ion renders the demodulators 210, 211 and 212 mutually ompatible in their operation. This is paricularly due to ıe fact that each demodulator, as indicated before, pro-ides in its passive state a predetermined stable signal vhich appears in substitution of the color signal then tem-orarily switched off. In this manner, the demodulators o not interfere with each other in their operation and ndesirable off-color hues are at the same time avoided.

This is a remarkable advance if one considers that ıese extra features are in accordance with the invention rovided by the very operation of the basic circuit com-onents which carry out the fundamental demodulation nd gating functions. In the subject embodiment, the sub-:itute signal is provided by the switching transistor 32 vhich has a collector electrode 35 connected to the output esistor junction 48 for providing such substitute signal, s has been fully disclosed in the above mentioned co-ending Dann application. As a further advantage, the ignal channels represented by the demodulators 210, 211 nd 212 match each other very precisely in gain and di-ect-current output level for a given direct-current input ɛvel, so that these channels are highly compatible with ach other.

FIG. 3 is a block diagram of a switching system 280 mbodying the subject invention and serving to resolve ignal trains in which differently characterized signal com-onents occur in line-sequential fashion. The resolution oncerns the extraction of signal components from these :ains. The system of FIG. 3 may, for example, be used for endering signals provided during the playback of a video ıpe recorder suitable for display by a color television ɛceiver. If desired, the system of FIG. 3 can be asso-iated with the system of FIGS. 1 and 2 so as to permit a layback of color video signals after the recording thereof s described above.

The system of FIG. 3 includes three main switches 81, 282, 283, and three auxiliary switches 284, 285 and 86. The switches 281 through 286 are substantially alike nd are closely similar as to circuitry to the apparatus ıown in and described in connection with FIG. 2 of ıe aforesaid copending Dann application.

Red-green-blue line-sequential video signals are derived ·om a video tape recorder 251 engaged in a playback peration and are delivered to a common terminal 288 nd from there to another common terminal 289. These gnals are also delivered to a further common terminal 90 after having been delayed by a period of time equal › one horizontal line of the video signal complex. For ıis purpose, a one-line broadband delay-line system 291 interposed between the terminals 288 and 290. This elay-line system is constructed in accordance with rele-ant conventional delay-line design techniques that do ot form part of the subject invention. To name an ex-mple, ultrasonic quartz delay lines have been found to e capable of providing the required bandwidth for pres-nt purposes.

The relatively undelayed signals are supplied from the ommon terminal 289 to the signal inputs 293, 294 and 95 of the switches 281, 282 and 283. The relatively de-ıyed signals are supplied from the common terminal 290 › the signal inputs 297, 298 and 299 of the switch 284, 85 and 286.

To facilitate an understanding of the subject system, ıe switches 281, 282 and 283 have been labeled as R, G, nd B (red, green, blue) switches, while the switches 284, 85 and 286 have been termed R′, G′ and B′ (red-de-.yed, green-delayed, blue-delayed) switches.

The switches 281 through 286, respectively, have gate ıputs 300 through 305. A "red gate" is supplied to the ate inputs 300 and 305 to actuate the R-switch 281 and ıe B′-switch 286. A "green gate" is supplied to the gate inputs 301 and 303 to actuate the G-switch 282 and the R′ switch 284. A "blue gate" is supplied to the gate inputs 302 and 304 to actuate the B-switch 283 and the G′-switch 285. These red, green and blue "gates" may be the gating signals provided at outputs 226, 227 and 228, respectively, of the sequencer 225 in FIG. 1. Synchronization signals for controlling the operation of this sequencer may be derived from the output of the video tape recorder 251, since such signals are recorded by the video tape recorder, and are played back, along with the color component signals. Conventional components of the type mentioned in connection with FIG. 1 may then be used to produce from these synchronization signals the J and P signals for driving the sequencer 225 (see FIG. 1).

This is readily apparent to those skilled in the art, so that the representation of the sequencer 225 shown in FIG. 1 is not repeated in FIG. 3.

The switches 281 through 286 respectively have outputs 307 through 312 for the particular gated color components. The outputs 307 and 310 are connected to a first summing point 314 through output resistors 315 and 316, respectively. The output 308 and 311 are connected to a second summing point 317 through output resistors 318 and 319, respectively, while the outputs 309 and 321 are connected to a third summing point 320 through output resistors 321 and 322, respectively.

The signals occuring at the summing point 314 are amplified by a first summing amplifier 324 and are thereupon applied through a lead 325 to a grid-drive amplifier (not shown) provided for the processing of color video signals for the display of red colors. The signals occurring at the summing point 317 are amplified by a second summing amplifier 326 and are thereupon applied through a lead 327 to a grid-drive amplifier (not shown) provided for the processing of color video signals for the display of green colors. Similarly, the signals occurring at the summing point 320 are amplified by a third summing amplifier 328 and are therupon applied through a lead 329 to a grid-drive amplifier (not shown) provided for the processing of color video signals for the display of blue colors.

The grid-drive amplifiers just mentioned may be of conventional design (see Fink pp. 6–211 to 225) as may the summing amplifiers 324, 326 and 328. If a three-gun color picture tube (not shown) is employed, each of the three grid-dive amplifiers herein mentioned drives another one of the three electron guns.

For convenience, the leads 325, 327 and 329 have been labeled in FIG. 3 "to red grid-drive amplifier," "to green grid-drive amplifier," and "to blue grid-drive amplifier," respectively, in accordance with the colors to which the above mentioned three electron guns may respectively be allocated.

An inspection of FIG. 3 shows that "red" color signals are applied to the red grid-drive amplifier and delayed "blue" color signals are applied to the blue grid-drive amplifier when the above mentioned red gate turns the switches 281 and 286 on. When the green gate turns the switches 282 and 284 on, "green" color signals are applied to the green grid-drive amplifier and delayed "red" color signals are applied to the red grid-drive amplifier. Similarly, when the blue gate turns the switches 283 an 285 on, "blue" color signals are applied to the blue grid-drive amplifier and delayed "green" color signals are applied to the green grid-drive amplifier.

It has been found in practice that this permits technically and economically feasible video tape recording and display operations of good quality. It is pointed out in this connection that the basic principle of delaying color video signals played back from a video tape recorder and of displaying simultaneously delayed and undelayed color components is not as such part of the subject invention. Principles of this type are disclosed in the aforesaid applications Ser. Nos. 538,815 and 538,816.

Figure 4:
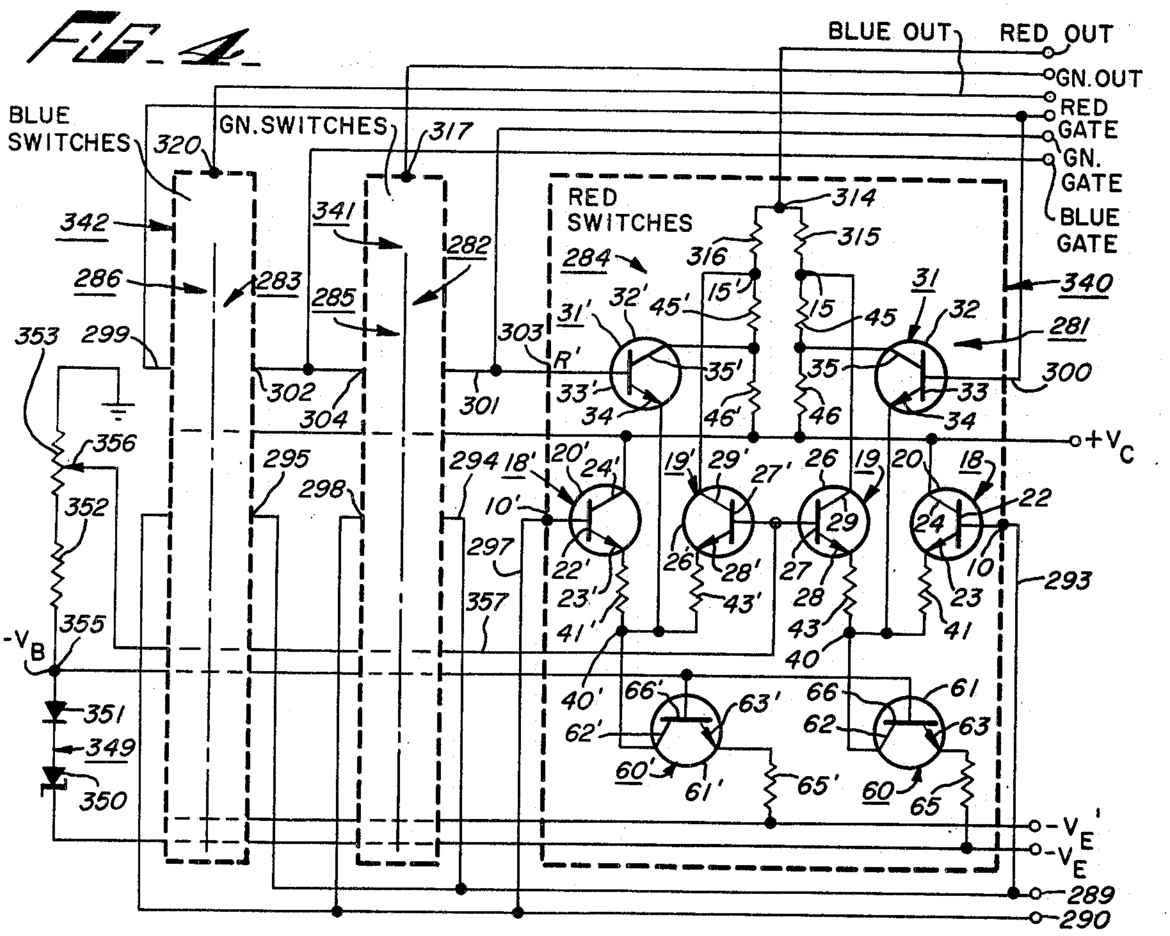
FIG. 4 is a diagram of switches used in the system of FIG. 3.

FIG. 4 more fully illustrates the switches 281 through 286 shown in FIG. 3. To this end, the R-switch 281 and the R'-switch 284 have been shown within one block 340, while the G-switch 282 and the G'-switch 285 have been united in one block 341, and the B-switch 283 and the B'-switch 286 in one block 342.

The circuits of the switches 281 and 284 are shown diagrammatically within block 340. These circuits are identical for the switches 282 and 285 in block 341, and the switches 283 and 286 in block 342, and are thus not shown again in blocks 341 and 342.

The circuits shown in block 340 are closely similar to the circuit of FIG. 2 of the aforesaid copending Dann application. Accordingly, like parts as to that FIG. 2 and the circuit of the switch 281 of the subject FIG. 4 are designated by like reference numerals. The same mode of reference is employed with respect to the circuit of switch 284 of the subject FIG. 4, except that the like reference numerals shown therein are provided with prime signs to preserve a convenient distinction between the circuit elements of switch 284 and those of switch 281.

Pertinent reference numerals from FIG. 3 have also been inserted into FIG. 4 to designate parts that are alike as among FIGS. 3 and 4 of the subject application.

The general operation of the circuits shown in FIG. 4 will be readily understood from a consideration of the detailed descriptions of FIG. 2 of the aforesaid Dann application. The operation of the apparatus shown in FIGS. 3 and 4 may be outlined as follows:

The red gate provides a quiescent voltage level which causes the switching stage 31 of switch 281 to maintain the amplifier stages 18 and 19 in a cut-off state and to provide a signal level of predetermined magnitude at the summing point 314 tending to bias the particular grid of the red color gun to its blanking level. At the appropriate time, the red gate provides a pulse for turning the switching stage 31 off. This switches the amplifier stages 18 and 19 on, and the red color signal component can proceed from terminal 289 to the summing point 314 for amplification and application to the particular grid of the red color gun (not shown).

To terminate this phase of operation, the red gate is returned to its quiescent voltage level causing the switching stage 31 to turn the amplifier stages 18 and 19 to their off state.

Similarly, the green gate provides a quiescent voltage level which causes the switching stage 31' of switch 284 to maintain the amplifier stages 18' and 19' in a cut-off state and to provide a signal level of predetermined magnitude at the summing point 314 tending to bias the particular grid of the red color gun to its blanking level.

Owing to the inventive configuration of the circuits shown in FIG. 4 and the provision of the previously described substitute signals, the switches 281 and 284 are mutually compatible, in that the operation of neither will adversely interfere with the operation of the other. This permits either circuit to drive the particular color gun independently, while the other circuit supplies a signal tending to bias that gun to its blanking level. The substitute signal provision as such has been fully disclosed in the aforesaid copending Dann application which should be consulted in these and other respects.

At the appropriate time, the green gate turns the switching stage 31' off. This turns the amplifier stages 18' and 19' on and the delayed red color signal component can proceed from terminal 290 to the summing point 314 for amplification and application to the above mentioned grid of the red color gun.

This phase of operation is terminated upon a return of the green gate to its quiescent voltage level causing the switching stage 31' to turn the amplifier stages 18' and 19' to their off state.

The other switches 282 and 285, represented by box 341, and switches 283 and 286, represented box 342, are operated by the red, green and blue gates in analogous fashion, as will be understood from the above description of FIG. 3.

The previously described transient switching signal suppression features are also provided by the circuits of FIG. 4 so that the repaired quality of the color presentation is preserved. In a manner similar to that illustrated in FIG. 2 of the aforesaid Dann application, current stabilizing stages 60 and 60' are provided in the circuits of FIG. 4 to enhance the transient suppression feature and further improve circuit performance as has been explained in the aforesaid copending Dann application.

In FIG. 4, the required bias voltage $-V_B$ for the base electrodes 66 and 66' is provided by a circuit 349 extending between $-V_E$ and ground and including a Zener diode 350, a rectifier cell 351, a resistor 352 and a potentiometer 353. The bias voltage $-V_B$ is taken at the junction 355 between cell 351 and resistor 352.

The potentiometer 353 has a movable arm 356 which is connected by a lead 357 to the base electrodes 27 and 27' of the transistors 26 and 26'. In this manner, a variable voltage is applied to these base electrodes which is equivalent to the voltage provided in FIG. 2 of the aforesaid Dann application by the source 42, and which serves to permit adjustments in the level of the blanking signal appearing at the summing point 314 when the stages 18 and 19 and 18' and 19' are switched off.

The circuit 349 may perform equivalent functions for the switches 282, 283, 285 and 286.

By way of example, the voltage $-V_E$ may be $-12$ volts and the components of the circuit 349 may be selected as follows:

Zener diode 350=1N751A (5.1 v.);
Rectifier cell 351=T1–9;
Resistor 352=510 ohms; and
Potentiometer 353=100 ohms.

If desired, functional interference between the stabilizing stages 60 and 60' can be minimized by providing a source (not shown) which supplies the voltage $-V_E'$ shown in FIG. 4. This source is separate from the source which supplies the voltage $-V_E$. By way of example, the voltage $-V_E'$ may also be $-12$ volts.

By way of illustration, and not by way of limitation, the following values are given for other components shown in FIG. 4:

Transistors 20, 20', 26, 26', 32, 32'=2N3694;
Transistors 61 and 61'=2N3565;
Resistors 41 and 41'=301 ohms each;
Resistors 43 and 43'=182 ohms each;
Resistors 45 and 45'=511 ohms each;
Resistors 46 and 46'=750 ohms each;
Resistors 65 and 65'=511 ohms each; and
Resistors 315 and 316=3,570 ohms each.

The voltage $+V_C$ may be $+12$ volts.

While various systems and apparatus for the switching and processing of video signals have been shown herein, this should not be taken as an indication that the subject invention, in its basic aspects, is so limited in its utility or purpose. To the contrary, it will be appreciated from the above description of the basic, as well as of the advanced, inventive concepts that the subject invention by its very nature lends itself to a multitude of different signal switching, manipulating and processing applications.

Also, those skilled in the art will appreciate that many modifications may be made in the systems, apparatus, circuits and modes of operation shown herein without deviation from the scope of the invention.

We claim:

1. Apparatus for resolving a signal train including a number of differently characterized signal components into corresponding signal components, comprising:

(a) an individual signal processing means for each signal component as to which the signal train is to be resolved, each of said signal processing means including:

(1) input means;

(2) output means;

(3) control signal receiving means;

(4) signal processing circuits connected between said input means and said output means and constructed to process an electric signal component received at said input means and to apply the processed signal component to said output means; and (5) switching means having an input circuit connected to said control signal receiving means, having a control circuit connected to said signal processing circuits for suspending at least the application of said processed signal component to said output means in response to a control signal received at said control signal receiving means, and having an output circuit connected to said output means for providing in response to said control signal an auxiliary signal applied to said output means in substitution of said processed signal component;

(b) means connected to the input means of the different signal processing means for applying said signal train with said differently characterized signal components to the input means of said individual signal processing means; and (c) means connected to the control signal receiving means of said individual signal processing means for providing different control signals in a predetermined repetitive sequence for the switching means of the individual signal processing means and for selectively applying said different control signals to the control signal receiving means of the individual signal processing means.

2. Apparatus for resolving a signal train including a number of differently characterized modulated signal components into corresponding sequentially occurring demodulated signal components, comprising:

(a) a separate demodulator for each of said differently characterized modulated signal components, each demodulator including:

(1) input means;

(2) output means;

(3) control signal receiving means;

(4) reference signal receiving means; and (5) signal processing means connected between said input means and said output means, and connected to said control signal receiving means and to said reference signal receiving means, and constructed to demodulate an electric signal component received at said input means with the aid of a reference signal received by said reference signal receiving means, and to apply the demodulated signal to said output means, and further constructed to suspend at least the application of said demodulated signal to said output means in response to a control signal received by said control signal receiving means;

(b) means for applying said signal train with said modulated signal components to the input means of each demodulator;

(c) means for providing a different reference signal for each demodulator and for applying the different reference signals individually to the reference signal receiving means of each demodulator to cause each demodulator to demodulate a different one of said modulated signal components; and (d) means for providing a different control signal for each demodulator with the control signals for all demodulators occurring in a repetitive sequence, and for individually applying the different control signals to the control signal receiving means of said demodulators.

3. Apparatus as claimed in claim 2, including means connected to said output means of each demodulator for unifying the demodulated signals provided by the demodulators to a signal train in which said demodulated signals occur sequentially.

4. Apparatus as claimed in claim 2, wherein said reference signal providing means include means for providing an oscillating reference signal and means for shifting the phase of said oscillating reference signal by different degrees for providing said different reference signals.

5. Apparatus as claimed in claim 2, wherein said signal processing means of each demodulator include:

(a) demodulator means connected between said input means and said output means and connected to said reference signal receiving means for demodulating an electric signal component received at said input means, and for applying the demodulated signal to said output means; and (b) switching means having an input circuit connected to said control signal receiving means, having a control circuit connected to said demodulator means for suspending at least the application of said demodulated signal to said output means in response to a control signal received at said control signal receiving means, and having an output circuit connected to said output means for providing in response to said control signal an auxiliary signal applied to said output means in substitution of said demodulated signal while the application of said demodulated signal to said output means is suspended.

6. Apparatus for resolving a signal train including at least three differently characterized sequential signal components into an equal number of differently characterized component signal trains, comprising:

(a) first main switch means and first auxiliary switch means for one of said signal components;

(b) second main switch means and second auxiliary switch means for another of said signal components;

(c) third main switch means and third auxiliary switch means for yet another of said signal components;

(d) each of said first, second and third main switch means and each of said first, second and third auxiliary switch means including:

(1) input means;

(2) output means;

(3) control signal receiving means;

(4) signal processing means connected between said input means and said output means and constructed to process a signal component received at said input means and to apply the processed signal component to said output means; and (5) switching means having an input circuit connected to said control signal receiving means, having a control circuit connected to said signal processing means for suspending at least the application of said processed signal component to said output means in response to a control signal at said control signal receiving means, and having an output circuit connected to said output means for providing in response to said control signal an auxiliary signal which is applied to said output means in substitution of said processed signal while the application of said processed signal to said output means is suspended;

(e) means for applying said signal train to the input means of said first, second and third main switch means;

(f) means for time-delaying said signal train and applying the time-delayed signal train to the input means of said first, second and third auxiliary switch means;

(g) means for providing first, second and third sequentially occurring control signals and for individually applying said first, second and third control signals to said main switch means and to said auxiliary switch means to cause the switching means of said main and said auxiliary switch means to operate in a recurring predetermined sequence;

(h) means connected to the output means of said first main switch means and to the output means of said first auxiliary switch means for providing one of said component signal trains;

(i) means connected to the output means of said second main switch means and the output means of said second auxiliary switch means for providing another of said component signal trains; and (j) means connected to the output means of said third main switch means and said third auxiliary switch means for providing yet another of said component signal trains.

References Cited

UNITED STATES PATENTS

| | | | |
|---|---|---|---|
| 2,657,318 | 10/1953 | Rack | 307—243 |
| 2,875,272 | 2/1959 | Cuccia | 178—5.4 |
| 2,922,838 | 1/1960 | Torre et al. | 178—5.4 |
| 3,283,067 | 11/1966 | Bazin et al. | 307—241 XR |

JOHN S. HEYMAN, Primary Examiner

J. ZAZWORSKY, Assistant Examiner

U.S. Cl. X.R.

178—5.4; 307—231, 244; 328—75, 139; 329—50